H. G. & H. G. SEEKINS.
Foot Warmer.

No. 18,868.

Patented Dec. 15, 1857.

UNITED STATES PATENT OFFICE.

H. G. SEEKINS AND H. G. SEEKINS, JR., OF ELYRIA, OHIO.

FOOT-WARMER.

Specification of Letters Patent No. 18,868, dated December 15, 1857.

*To all whom it may concern:*

Be it known that we, HEBER G. SEEKINS, and HEBER G. SEEKINS, Jr., of Elyria, in the county of Lorain and State of Ohio, have made certain Improvements in Hydrocaloric Footstools; and we do hereby declare that the following is a full, clear, and exact description of the same, reference being had to the annexed drawings, and the letters marked thereon and making a part of this description, and in which—

Figure 1:
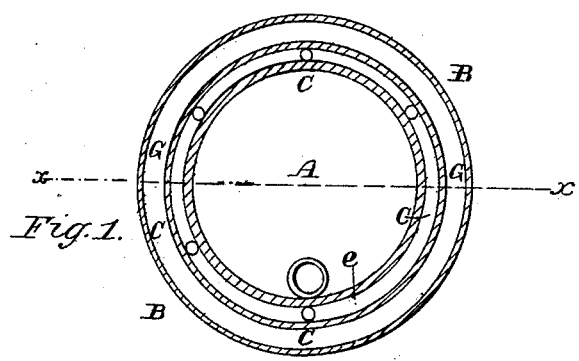
Figure 2:
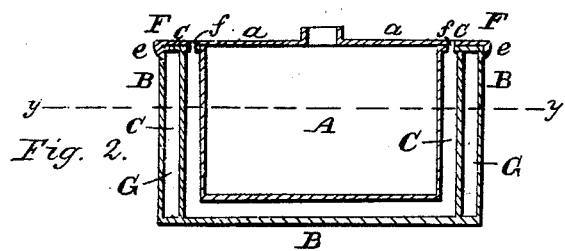

Figure 1, is a sectional plan view taken in the line $y\ y$ Fig. 2. Fig. 2 is a vertical transverse section taken in line $x, x$, Fig. 1.

Like letters refer to like parts in the different figures.

The nature of our invention consists in constructing a hydrocaloric footstool, with three separate compartments, one of which is filled with heated water and tightly corked. One of the others is designed for common atmospheric air. The other or outer compartment is filled with any nonconducting substance such as coaldust, sawdust, or atmospheric air (either of the former are preferred although the latter answers a good purpose, it being a good nonconductor of heat although it does not retain its heat so long as more dense substances,) the object of which is to prevent the absorption or escape of heat through the sides or bottom of the apparatus. And to retain all of said heat until it has passed off through the top of the reservoir, by this simple and effective arrangement we are enabled to retain the heat for many hours longer than we could if we were to omit the outer shell. We also provide the apparatus with valves or openings which may be opened or closed at pleasure for the purpose of allowing the heated air of the inner compartment to escape and thus create a more intense degree of heat around the feet of persons using the apparatus without exposing the reservoir to the cold atmosphere. As it will be observed that the outer compartment being filled the heat there confined will effectually prevent the cold air coming in contact with the heated air in the inner air chamber or the reservoir.

To enable others skilled in the art to make and use our invention we will now proceed to describe its construction and operation.

A represents the reservoir the cover "$a$," of which is secured by means of solder said cover projects over and forms a flange "$e, e$," around the upper edge of the reservoir, as seen in Fig. 2. Said flange is perforated as seen at "$c, c$."

B is the outer case which is constructed in the manner and form seen in the drawings having an inner shell C passing around as seen in Fig. 1, and forming a circular compartment G which is airtight. Said compartment is covered over the top with a flange F, which projects in to the side of reservoir. Said flange is provided with perforations $f\ f$ which exactly correspond with those of the flange $e$ at "$c, c$." When said cover is turned slightly in either direction the perforations will not coincide and the aperture is consequently closed, the intermediate space between the reservoir and the shell C and that between the bottom of the reservoir and the bottom of the case forms an air chamber. While the reservoir is in its place which becomes heated said heat is thence imparted to the outer chamber or compartment G where it is retained, thus surrounding the reservoir with a secure protection against the cold air and compelling the heat to pass upward through the cover when it can be made available for the purpose for which it is intended. The regulation of the escape of the heated air of the inner air chamber is of great importance as it enables the operator to regulate the amount of caloric that he wishes to have escape at pleasure.

The great advantage embraced in this very useful apparatus will be made apparent when we consider how necessary it is to retain all of the heat contained in the water as long as possible and at the same time let it escape in the proper direction. It will be readily understood that if the outer airtight chamber was omitted the air contained in the inner chamber would be of a much lower temperature when allowed to escape, and consequently as much less effective, also when the heated air was replaced by cold air in the inner chamber, the effect would be much more serious to the heat in the water because the cold air would not only absorb the heat of the said water but would absorb the cold which surrounded it, but in this case the cold air in the air chamber will not only absorb the heat of the water but will absorb a much greater portion of heat from the heated air in the outer compartment from the fact that there is more heating surface on the outer side than there is on the inner side.

We do not claim the reservoir the air chamber nor the nonconducting compartment, but What we do claim and desire to secure by Letters Patent is—

Constructing the reservoir A, with a flange $e$, having perforations $c, c$, which shall correspond with the perforations $f, f$, in the flange F, substantially in the manner and for the purpose herein set forth and described.

HEBER G. SEEKINS. [L. S.]
HEBER G. SEEKINS, JR. [L. S.]

Signed and sealed in presence of:
J. F. WILSON,
C. H. DOOLITTLE.